United States Patent [19]

Tucker

[11] 4,190,942

[45] Mar. 4, 1980

[54] APPARATUS AND METHOD FOR WINDING AND INSERTING SHEET MATERIAL INTO A TUBE

[76] Inventor: Percy A. Tucker, P.O. Box 34357, Richmond, Va. 23234

[21] Appl. No.: 923,514

[22] Filed: Jul. 10, 1978

[51] Int. Cl.$^2$ .................... B31C 13/00; B23P 15/00; B23P 19/04

[52] U.S. Cl. .................................... 29/451; 29/234; 29/282; 93/81 R; 93/77 CL; 242/68

[58] Field of Search ................ 29/451, 234, 235, 282, 29/270, 272; 53/430, 119; 242/68; 93/81 R, 77 CL, 77 R, 94 R, 15

[56] References Cited

U.S. PATENT DOCUMENTS

| | | | |
|---|---|---|---|
| 147,679 | 2/1874 | Nichols et al. | 242/68 |
| 537,053 | 4/1895 | Lutz | 93/81 R |
| 634,191 | 10/1899 | Truyter | 93/77 R |
| 657,647 | 9/1900 | Curtis | 93/81 R |
| 789,788 | 5/1905 | Bellamy | 242/66 |
| 869,902 | 11/1907 | Harbeck | 93/77 R |
| 1,047,422 | 12/1912 | Loewy | 53/119 |
| 1,230,130 | 6/1917 | Davis | 93/81 R |
| 1,285,044 | 11/1918 | Clay | 93/81 R |
| 1,340,110 | 5/1920 | Bolger | 93/81 R |
| 1,343,351 | 6/1920 | Collins | 29/270 |
| 1,918,268 | 7/1933 | Hinckley et al. | 29/270 |
| 2,388,774 | 11/1945 | Tice | 242/68 |
| 2,696,335 | 12/1954 | Fies | 53/119 |
| 3,685,757 | 8/1972 | Fedor | 242/68 |

FOREIGN PATENT DOCUMENTS

| | | | |
|---|---|---|---|
| 600506 | 6/1960 | Canada | 242/68 |

*Primary Examiner*—Daniel C. Crane

*Attorney, Agent, or Firm*—Dowell & Dowell

[57] ABSTRACT

An apparatus for winding a first generally planar sheet material into a tubular configuration and thereafter winding a second generally planar strip of material over a portion of the first material and thereafter inserting said first and second materials into a transparent or translucent barrel of a pen or mechanical pencil so that at least a portion of said first and second materials or any indicia carried thereon are displayed through the barrel.

5 Claims, 6 Drawing Figures

Fig. 1
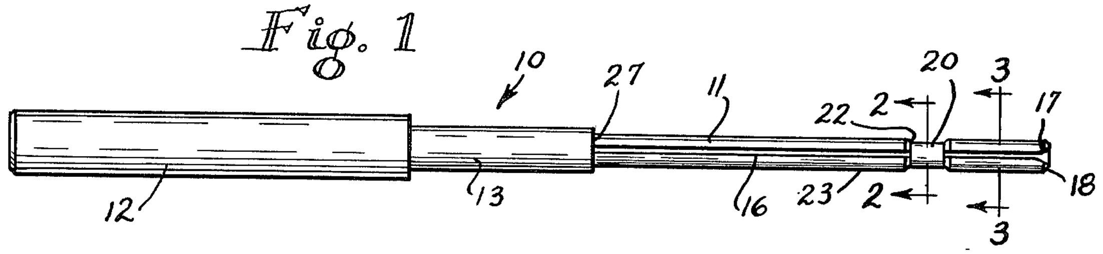
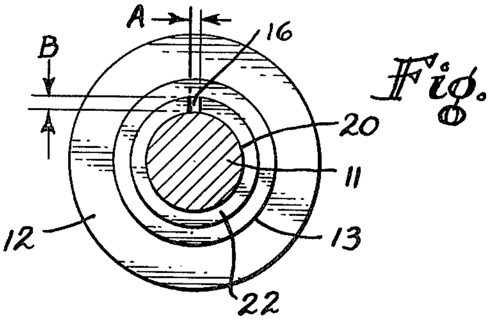
Fig. 2
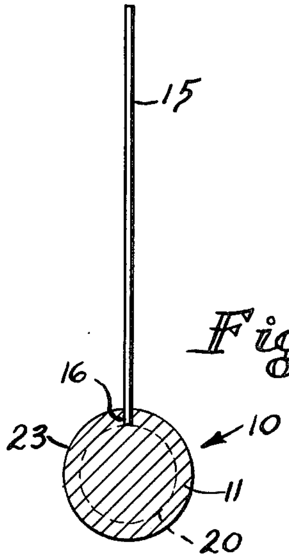
Fig. 3
Fig. 4
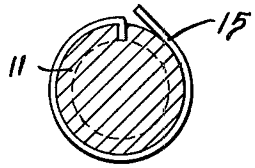
Fig. 6
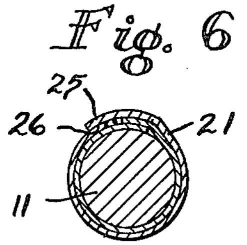
Fig. 5
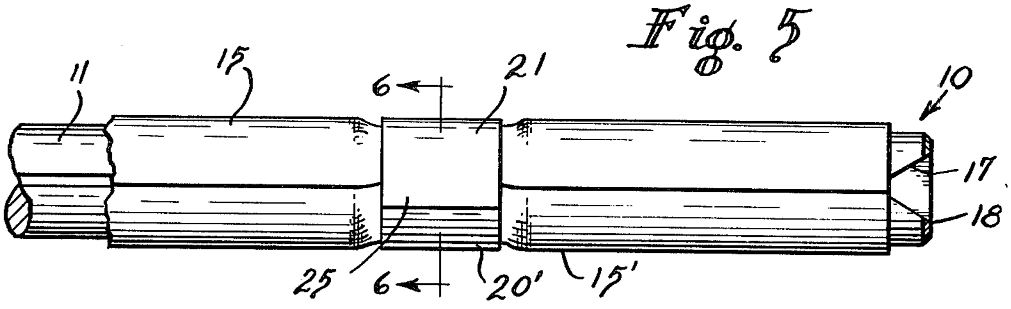

APPARATUS AND METHOD FOR WINDING AND INSERTING SHEET MATERIAL INTO A TUBE

BACKGROUND OF THE INVENTION

1. Field of the Invention: This invention is generally related to apparatus for inserting various displays or indicia into the barrel of pens or similar hollow structures so as to be displayed therethrough and specifically to a mandrel for supporting and winding two separate sheets of material so as to enable such material to be inserted and selectively spaced relative to one another within the barrel of such a hollow article.

2. History of the Prior Art: Due to the fact that pens and mechanical pencils are items which are necessities for personal, political or business related activities, advertisers have long taken advantage of the widespread and daily use to disseminate or advertise various information. From people and businesses to calendars and quotes, the use of advertising indicia in connection with writing implements is an accepted and widespread practice.

The specific type of indicia which has been used by prior art manufacturers has taken many forms. One basic technique is printing or stamping indicia onto the exterior portion of the writing implement. Due to the amount of use many writing implements receive, however, often the printed matter is worn from the implement after a very short period of time. Further, the use or scope of such printed advertising is limited to a visual or pictorial representative of words or pictures.

In addition to printing or stamping, decals or labels have been placed on the exterior of writing implements. Here, again, the amount of wear encountered is detrimental and the type of advertising is limited.

In order to protect the advertising indicia from damage or wear, many manufacturers have developed various types of inserts which are placed within the housing of the writing implement itself and may be either selectively viewable through specifically designed apertures or constantly viewable through transparent or translucent portions of the implement housing.

In this regard, one technique of interior display has been to pre-form a cylindrical tube of cardboard or paper on which various indicia may be printed or separately adhered. Thereafter, the self-sustaining tubular structure is inserted into the interior of the implement, as for example, into the transparent barrel of a pen.

Processes such as pre-forming a cylindrical insert have presented problems in regard to printing, coloring or otherwise fixing indicia to the insert. Therefore, in applicant's co-pending application, Ser. No. 821,055, filed Aug. 1, 1977, now U.S. Pat. No. 4,136,431, a process and apparatus for generally simultaneously winding and inserting planar preprinted indicia carrying sheets into tubular items such as the barrel of a pen are described. Such process permits printing displays upon planar material and thereafter forming the planar material into the desired cylindrical shape as the material is inserted into the barrel of a pen or similar implement.

The placement of advertising indicia into hollow housings need not be limited to the use of single sheets of advertising material. Applicant has found that some advertisers would prefer to provide separate indicia or samples in addition to the generally used singular message carrying medium. For example, manufacturers of various clothing products may desire to encase a patch or sample of their material or fiber in the display casing together with a separate sheet carrying an advertising slogan.

Further, although there are a number of varieties of advertising type pens on the market which have several separate advertising or indicia carrying units mounted interiorly of the pen, many such structures require the pen housing to be specially adapted with various separate windows or apertures as well as various gearing arrangements to selectively adjust the indicia relative to the implement housing. Further, multiple pre-formed cylindrical displays have met with the same difficulties in printing and handling as are encountered in the aforementioned single pre-formed advertising cylinders.

SUMMARY OF THE INVENTION

This invention is embodied in a mandrel for forming and thereafter simultaneously inserting at least two separate generally planar sheets or strips of material into the transparent or translucent barrel of a pen or similar hollow display implement. The mandrel includes an elongated slot for receiving one edge of a first planar material and an annular recess specifically located along a selected portion thereof. After the first material is inserted into the longitudinal slot, the mandrel is turned to form the first material into a tubular configuration about the mandrel. Thereafter, a second material is positioned over the recess in the mandrel and wound around the first material until such second material is drawn into a circumference which does not exceed that defined by the periphery of the first material which has been previously wound about the mandrel.

It is a primary purpose of this invention to provide a mandrel upon which two separate generally planar sheets or strips of material may be initially wound and thereafter simultaneously inserted into the bore of a hollow display implement.

It is another object of this invention to provide a process by which two separate sheets of material which may or may not carry various advertising indicia may be selectively positioned in a lateral relationship relative to one another while in an overlapping cylindrical relationship and thereafter be maintained in such relative positioning while being simultaneously inserted into the transparent or translucent bore of a pen or similar writing implement.

It is a further object of this invention to provide a relatively inexpensive means by which two materials may be simultaneously inserted into the barrel of a pen or similar writing implement and thereafter be positioned in a desired overlying relationship with one another for purposes of advertising either the material or indicia which is selectively printed, stamped or otherwise placed thereon.

BRIEF DESCRIPTION OF THE DRAWING

FIG. 1 is a top plan view of the mandrel of this invention.

FIG. 2 is a section taken along line 2—2 of FIG. 1.

FIG. 3 is a section taken along line 3—3 of FIG. 1, showing a first sheet material inserted into the mandrel.

FIG. 4 is a section similar to FIG. 3 after the mandrel has been rotated substantially 360° from the position shown in FIG. 3.

FIG. 5 is an enlarged view of the tip portion of the mandrel with two separate sheets of material wrapped in overlying relationship.

FIG. 6 is a section taken along line 6—6 of FIG. 5.

DESCRIPTION OF THE PREFERRED EMBODIMENT

With continued reference to the drawing, an elongated mandrel 10 for winding and inserting a plurality of sheet materials into the hollow barrel of a pen, pencil or similar implement is shown as having a stepped configuration. The mandrel is generally cylindrical in shape and includes a sheet material winding or supporting tip portion 11, a handle 12, and an intermediate portion 13 which functions as a stop for the sheet material. The diameter of the tip portion 11 is less than that of the intermediate and handle portions and the handle portion is of a greater diameter than the intermediate portion. This three-stepped configuration allows the mandrel to be used with indicia inserting apparatus such as described in applicant's co-pending application Ser. No. 821,055 filed Aug. 1, 1977, which is incorporated herein by reference.

Although a three-stepped mandrel is shown as being the preferred embodiment, for purposes of this invention a two-stepped configuration (not shown) which would eliminate the intermediate portion 13 of the mandrel, could be used to wind and insert sheet material into the barrel of a pen or similar cylindrical container. Alternatively, another type of stop means could be employed on the barrel for purposes which will be described later.

In order to enable a first relatively planar sheet of material 15 to be coiled or rolled about the tip portion 11 of the mandrel, an elongated slot or channel 16 is formed along the length of the tip portion. It should be noted that the width of the slot 16 which is shown as dimension "A" in FIG. 2, is sufficient to permit the first material 15 to be slidingly engaged therein. Further, the depth of the channel shown as dimension "B" need only be sufficient to engage a portion of the edge of the first sheet material 15.

In order to facilitate the insertion of the sheet material 15 into the channel, an enlarged or flared opening 17 is provided along the outermost portion or end 18 of the tip 11. Therefore, as a sheet of material is fed either mechanically or by hand toward the mandrel 10, the leading edge of the material is guided by the tapered opening and directed into the channel 16.

As was discussed previously, there are many instances when advertisers may desire to include two or more separate indicia or samples in a single pen or similar display housing. In order to permit the simultaneous insertion of two or more sheets or strips of material, the mandrel of the present invention includes an annular recessed portion 20 which extends along a portion of the tip 11. The recess 20, as shown in FIG. 2, need only be deep enough to reduce the effective diameter of that portion of the tip 11 an amount sufficient to permit a second strip of material 21 to be wrapped or coiled about the first material supported about the mandrel without such second material extending to an appreciable degree beyond the periphery defined by the coil formed by the first material.

The recess 20 is constructed having inclined edges 22 which taper the recess downwardly and inwardly from the outer surface 23 of the tip 11. As will be more fully discussed later, the inclined recess is functional in assisting the withdrawal of the mandrel from engagement with the materials coiled thereon after such materials have been placed within a housing such as the barrel of a pen.

Although not shown in the drawing, it is contemplated that more than one recess 20 may be provided along the length of the mandrel tip 11 so that a multiplicity of secondary strips 21 can be simultaneously inserted into a display housing. Further, the exact location of each recess 20 may be predetermined and selectively provided at various positions or locations along the tip of the mandrel. That is, it may be desirable to display the secondary strip of material or advertising 21 relative to a particular portion of the underlying sheet of material 15. For instance, the underlying material 15 may include advertising which is meant to be visible along both sides of a centrally disposed sample of the advertised product which may be in the form of a strip of material designated as 21 in the drawing. By providing the recess along a selected portion of the tip, the desired positioning of the second material relative to the first may be insured.

In use two separate generally planar indicia or material displays can be placed into the transparent or translucent barrel of a pen or similar implement in a simultaneous operation. With particular reference to FIGS. 3–6, a first sheet of material 15 is initially brought into alignment with the elongated axis of the mandrel and one edge thereof is guided along the channel 16. The material may be constructed of flexible or pliable metal, plastic, paper, cardboard, cloth or similar sheet material and may be provided with a preprinted indicia bearing surface. It should be noted that it is preferred that the size of the first material 15 be such that it will form a generally complete cylindrical shape when rolled or coiled so as to conform to the diameter and shape of the interior surface of the pen barrel or similar housing into which the material is to be introduced.

Once the first material 15 is inserted along the channel 16, the mandrel is rotated either mechanically or by hand so as to coil the material about the tip 11 of the mandrel as shown in FIG. 4 with the indicia-carrying surface disposed outwardly. Next the second planar strip of material, which may or may not carry some indicia, is placed over the first material and positioned outwardly of the mandrel recess 20. Thereafter the second strip of material is coiled about the mandrel and drawn into the recess 20 so that the outer surface 20′ thereof is substantially aligned with the outer surface 15′ of the underlying material 15. It is noted, however, that one end 25 of the strip 21 may overlap the remainder of the coiled material as is shown in FIG. 6.

In some instances the overlapped end 25 of the material 21 may have a weak adhesive applied to the underside thereof at 26. In this manner, the outer material coil 21 will maintain itself and the underlying material in coiled relationship about the mandrel 10. The use of such an adhesive, however, is not always necessary or contemplated. If the mandrel is used in an automated process, resilient guides may engage the outer surface of the materials 15 and 21 and thereby maintain them in coiled relationship during the pen inserting cycle which follows after the materials have been coiled about the mandrel. In hand operations, workers may simply use their fingers to maintain the materials in their coiled state.

Having coiled both materials about the tip of the mandrel, the mandrel 10 is inserted automatically or by hand into the barrel of a pen or similar implement (not shown). As the mandrel is urged into the pen barrel, the shoulder 27 defined between the tip portion 11 and the intermediate portion 13 of the mandrel, or other stop means which may be employed, will limit the depth of penetration by positively engaging the outer housing of the barrel. Once the materials have been initially inserted into the opening or mouth of the barrel, the materials will be maintained in their coiled and relatively disposed positions by the interior surface of the barrel.

After the materials have been completely inserted, the operator simply withdraws the mandrel from the barrel. In instances where the material has been coiled about the mandrel without the use of adhesive, the coils will tend to expand outwardly to assume their naturally non-coiled configuration. Although the interior of the barrel will limit the amount of coil expansion, there need be only a slight increase in the effective diameters to permit the mandrel to be withdrawn without disturbing the position of the materials in the barrel. Further, the tapered sides 22 of the recess 20 will assist in urging the materials outwardly from the mandrel as it is withdrawn.

In those instances when a weak adhesive has been applied to loosely bind the outer material to itself, the operator need only place his fingers along the outside of the mandrel adjacent to the mouth of the barrel and thereafter urge the mandrel outwardly of the barrel. The fingers of the operator, or similar mandrel-engaging means in automated machinery, will serve as a stop to prevent the materials from being displaced outwardly of the barrel as the mandrel is withdrawn. Further, the beveled edges of the recess 20 will again force the coil of material 21 to expand outwardly.

After the mandrel has been withdrawn, the pen is assembled utilizing the barrel having the separate indicia-carrying materials positioned thereon so as to be viewable or displayed as the pen is used.

I claim:

1. An apparatus for winding a relatively wide first sheet of material into a tube and winding a relatively narrow second sheet of material onto said tube in a fixed position intermediate the ends thereof, comprising an elongated mandrel, a generally cylindrical portion extending axially from one end of said mandrel, channel means extending along said cylindrical portion generally parallel with the axis thereof for receiving one edge of said first sheet, stop means on said mandrel in a position to stop said first sheet, at least one annular recess located intermediate said end of said cylindrical portion and said stop means, said recess having first and second annular walls in spaced and non contacting relationship with one another, said recess being at least as wide as said second sheet of material, and means for rotating said mandrel, whereby said first sheet may be inserted into said channel means in abutting relationship with said stop means so that rotation of said mandrel winds said first sheet into a tube located in a predetermined position on said cylindrical portion and thereafter said second sheet is aligned with said annular recess and wound onto said first sheet in a predetermined location relative to at least one end of the tube.

2. The invention of claim 1 in which said channel means includes a flared portion adjacent said outermost end of said generally cylindrical portion.

3. The invention of claim 1 in which said annular walls include beveled edges which incline upwardly and outwardly to said cylindrical portion.

4. A method for coiling at least first and second generally planar strips of sheet material and simultaneously inserting such materials into the barrel of a pen comprising the steps of:

coiling the first material about an elongated mandrel having at least one annular recess formed therein to thereby form the first material into a generally cylindrical shape of a first diameter which extends over said annular recess, wrapping the second strip of material over a portion of the first material and around the annular recess in the mandrel, urging the second material into a coiled configuration within the recess to form a coil of said second material having a diameter which is substantially equal to said first diameter, and inserting the mandrel into the barrel of the pen so as to dispose said first and second materials within said barrel simultaneously.

5. The method of claim 4 including the step of inserting one edge of said first generally planar material into an elongated channel in the mandrel prior to coiling said first material.

* * * * *